(12) United States Patent
Kondou et al.

(10) Patent No.: US 11,628,792 B2
(45) Date of Patent: Apr. 18, 2023

(54) VEHICLE SEAT

(71) Applicants: Toyota Jidosha Kabushiki Kaisha, Toyota (JP); Toyota Boshoku Kabushiki Kaisha, Kariya (JP); Toyoda Gosei Co., Ltd., Kiyosu (JP)

(72) Inventors: Keiichi Kondou, Chiryu (JP); Mitsuyoshi Ohno, Miyoshi (JP); Shohei Funaki, Miyoshi (JP); Hiroyuki Tomita, Aichi-ken (JP); Takashi Iida, Kiyosu (JP); Shigemi Mase, Kiyosu (JP)

(73) Assignees: TOYOTA JIDOSHA KABUSHIKI KAISHA, Toyota (JP); TOYOTA BOSHOKU KABUSHIKI KAISHA, Kariya (JP); TOYODA GOSEI CO., LTD., Kiyosu (JP)

( * ) Notice: Subject to any disclaimer, the term of this patent is extended or adjusted under 35 U.S.C. 154(b) by 33 days.

(21) Appl. No.: 17/166,469

(22) Filed: Feb. 3, 2021

(65) Prior Publication Data
US 2021/0291774 A1  Sep. 23, 2021

(30) Foreign Application Priority Data
Mar. 19, 2020  (JP) .............................. JP2020-050181

(51) Int. Cl.
*B60R 21/207* (2006.01)
*B60N 2/58* (2006.01)

(52) U.S. Cl.
CPC .......... *B60R 21/207* (2013.01); *B60N 2/5883* (2013.01); *B60N 2002/5808* (2013.01); *B60R 2021/2076* (2013.01)

(58) Field of Classification Search
CPC .......... B60R 21/207; B60R 2021/2076; B60N 2/5883; B60N 2002/5808; B60N 2/4221; B60N 2/42718; B60N 2/5825
See application file for complete search history.

(56) References Cited

U.S. PATENT DOCUMENTS

| | | | |
|---|---|---|---|
| 9,932,012 B1 * | 4/2018 | Line ..................... | B60N 2/6009 |
| 2007/0235993 A1 * | 10/2007 | Yoshikawa .......... | B60N 2/4221 |
| | | | 280/753 |

(Continued)

FOREIGN PATENT DOCUMENTS

| | | | |
|---|---|---|---|
| AU | 2011367335 A1 * | 11/2013 | ........... B60N 2/5825 |
| CA | 2329340 A1 * | 11/1999 | |

(Continued)

OTHER PUBLICATIONS

J. Tanabe, JP 2020-026161 Vehicle Seat, Machine English translation, ip.com (Year: 2020).*

(Continued)

*Primary Examiner* — Karen Beck
(74) *Attorney, Agent, or Firm* — Dinsmore & Shohl LLP

(57) ABSTRACT

A vehicle seat includes a seat cushion including a cover, a frame and a pad, a plurality of parts of the cover being restrained to the frame and the pad; a cushion airbag device mounted in a front portion in the seat cushion and configured to inflate and deploy an airbag at a time of a frontal collision of a vehicle; and a restraint release part provided in a part of the cover positioned at at least one side in a seat front-rear direction with respect to the cushion airbag device among the plurality of parts of the cover. The restraint release part is configured to release the restraint of the part of the cover with an inflation pressure of the airbag.

18 Claims, 12 Drawing Sheets

(56) References Cited

U.S. PATENT DOCUMENTS

| | | | |
|---|---|---|---|
| 2008/0224509 A1* | 9/2008 | Demick | B60N 2/5825 |
| | | | 297/218.2 |
| 2015/0033516 A1* | 2/2015 | Saiga | B68G 7/12 |
| | | | 24/594.1 |
| 2021/0078518 A1* | 3/2021 | Tanabe | B60R 21/26 |

FOREIGN PATENT DOCUMENTS

| | | | | |
|---|---|---|---|---|
| DE | 102014112282 A1 * | 3/2015 | | B60N 2/4228 |
| DE | 102017130257 A1 * | 6/2018 | | B60N 2/5825 |
| EP | 2022685 A2 | 2/2009 | | |
| EP | 3517371 A1 * | 7/2019 | | B60R 21/207 |
| EP | 2842802 B1 * | 11/2021 | | B60N 2/5816 |
| JP | 2009-035071 A | 2/2009 | | |
| JP | 2009-143283 A | 7/2009 | | |
| JP | 2010-052535 A | 3/2010 | | |
| JP | 2011-156907 A | 8/2011 | | |
| JP | 2013159220 A * | 8/2013 | | |
| JP | 2014080169 A * | 5/2014 | | |
| JP | 2018176884 A * | 11/2018 | | |
| JP | 2020026161 A * | 2/2020 | | |
| JP | 2020-199979 A | 12/2020 | | |
| JP | 2021041898 A * | 3/2021 | | B60N 2/5816 |

OTHER PUBLICATIONS

Jonsson et al. EP 2842802 B1 Back rest for a vehicle seat, Machine English translation, ip.com (Year: 2021).*

* cited by examiner

VEHICLE SEAT

CROSS-REFERENCE TO RELATED APPLICATION

This application claims priority to Japanese Patent Application No. 2020-050181 filed on Mar. 19, 2020, incorporated herein by reference in its entirety.

BACKGROUND

1. Technical Field

The present disclosure relates to a vehicle seat equipped with a cushion airbag device in a seat cushion.

2. Description of Related Art

In an airbag device described in Japanese Unexamined Patent Application Publication No. 2009-035071 (JP 2009-035071 A), an airbag disposed in a seat cushion of a vehicle seat is inflated and deployed at a time of a frontal collision of a vehicle to raise a seat surface of the seat cushion. With this, the occurrence of a phenomenon in which a waist of an occupant slips forward to pass under a lap belt part of a seat belt (so-called submarine phenomenon) is suppressed. A similar technique is disclosed in Japanese Unexamined Patent Application Publication No. 2010-052535 (JP 2010-052535 A).

SUMMARY

In the related art, since the airbag is inflated and deployed inside the seat cushion, the airbag may not be inflated and deployed to a desired shape due to influence of a material of the seat cushion cover (cover) or covering. In particular, in a case where the cover is made of leather, which is difficult to stretch, the tendency that the inflation and deployment of the airbag is restricted by the cover becomes noticeable, and the seat surface of the seat cushion is not sufficiently raised. Therefore, there is room for improvement from the viewpoint of improving effect of suppressing the occurrence of the submarine phenomenon.

The present disclosure provides a vehicle seat that can improve the effect of suppressing the occurrence of a submarine phenomenon.

An aspect of the present disclosure relates to a vehicle seat. The vehicle seat includes a seat cushion in which a plurality of parts of a cover is restrained to a frame and a pad, a cushion airbag device mounted in a front portion in the seat cushion and configured to inflate and deploy an airbag at a time of a frontal collision of a vehicle, and a restraint release part provided in a part of the cover positioned at at least one side in a seat front-rear direction with respect to the cushion airbag device among the plurality of parts of the cover and the restraint release part is configured to release the restraint of the part of the cover with an inflation pressure of the airbag.

With the vehicle seat according to the aspect of the present disclosure, in the seat cushion, a plurality of parts of the cover is restrained to the frame and the pad. In a front portion in the seat cushion, the cushion airbag device configured to inflate and deploy the airbag at a time of the frontal collision of the vehicle is mounted. With the inflation pressure of the airbag, the restraint is released by one or more restraint release parts provided in the part positioned at at least one side in the seat front-rear direction with respect to the cushion airbag device among the parts. Therefore, the inflation and deployment of the airbag is less likely to be restricted by the cover, and the airbag is easy to be inflated and deployed to a desired shape. As a result, the effect of suppressing the occurrence of the submarine phenomenon can be improved.

In the aspect of the present disclosure, of the cover, a front edge part may be restrained to the frame, while a hanging part provided in a middle portion of the cover in the seat front-rear direction may be restrained to the pad. Each of the front edge part and the hanging part may be provided with the restraint release part.

With the vehicle seat according to the aspect of the present disclosure, in the seat cushion, the front edge part of the cover is restrained to the frame, while a hanging part provided in a middle portion of the cover in the front-rear direction is restrained to the pad. Each of the front edge part and the hanging part is provided with the restraint release part. Therefore, when the airbag of the cushion airbag device is inflated and deployed at the front portion in the seat cushion, the restraints of the front edge part and the hanging part (the middle portion in the front-rear direction) of the cover are released at both sides in the seat front-rear direction with respect to the cushion airbag device. As a result, it is possible to effectively suppress the restriction of the inflation and deployment of the airbag by the cover.

In the aspect of the present disclosure, of the cover, each of a front edge part and a rear edge part may be restrained to the frame. Each of the front edge part and the rear edge part may be provided with the restraint release part. The restraint release part provided in the rear edge part may release the restraint earlier than the restraint release part provided in the front edge part.

With the vehicle seat according to the aspect of the present disclosure, in the seat cushion, each of the front edge part and the rear edge part of the cover is restrained to the frame, and each of the front edge part and the rear edge part is provided with the restraint release part. When the airbag of the cushion airbag device is inflated and deployed at the front portion in the seat cushion, the restraint release part provided in the rear edge part of the cover releases the restraint of the rear edge part to the frame earlier than the restraint release part provided in the front edge part of the cover. As a result, a rear portion side of the airbag is easy to be inflated and deployed upward over the seat, so that the airbag can be inflated and deployed in a shape that easily restrains a waist of an occupant at the initial stage of the frontal collision. After that, when the restraint of the front edge part of the cover is released from the frame, a front portion side of the airbag is easy to be inflated and deployed upward over the seat, so that the waist is easily restrained until the latter half of the frontal collision in which the waist of the occupant moves slightly toward a front side of the seat due to the inertia.

In the aspect of the present disclosure, the restraint release part may include a fragile part that is broken by the inflation pressure of the airbag.

With the vehicle seat according to the aspect of the present disclosure, the fragile part included in the restraint release part is broken by the inflation pressure of the airbag, such that the restraint of the cover is released at at least one side in the seat front-rear direction with respect to the cushion airbag device. Like this, since the fragile part is configured to be broken, the restraint release part can have a simple configuration.

In the aspect of the present disclosure, the fragile part may be a perforation formed in a cloth material forming a part of the cover.

With the vehicle seat according to the aspect of the present disclosure, the perforation formed in the cloth material forming a part of the cover of the seat cushion is broken by the inflation pressure of the airbag. Like this, since the mere perforation is used as the fragile part, the fragile part can have a simple configuration.

In the aspect of the present disclosure, the fragile part may be a fragile thread with which a main body part of the cover and a cloth material forming a part of the cover have been sewn together.

With the vehicle seat according to the aspect of the present disclosure, the fragile thread with which the main body part of the cover of the seat cushion and the cloth material forming a part of the cover have been sewn together is broken by the inflation pressure of the airbag. Like this, since the mere thread is used as the fragile part, the fragile part can have a simple configuration.

In the aspect of the present disclosure, the fragile part may be set in a resin restraining tool provided in the cover to restrain the cover to the frame or the pad.

With the vehicle seat according to the aspect of the present disclosure, the fragile part that is broken by the inflation pressure of the airbag is set in the resin restraining tool provided in the cover to restrain the cover of the seat cushion to the frame or the pad. Therefore, for example, the fragile part can be set when the restraining tool is molded.

In the aspect of the present disclosure, the restraint release part may include a stretch cloth that forms a part of the cover and stretches by 20 mm or more by the inflation pressure of the airbag.

With the vehicle seat according to the aspect of the present disclosure, a part of the cover is formed by the stretch cloth included in the restraint release part. The stretch cloth stretches by 20 mm or more by the inflation pressure of the airbag. Thereby, the restraint of the cover is released at at least one side in the seat front-rear direction with respect to the cushion airbag device. Since the pad of the seat cushion can be prevented from being exposed even when the stretch cloth is stretched, the appearance of the seat cushion can be prevented from being deteriorated due to the exposure of the pad.

In the aspect of the present disclosure, the restraint release part may include a deployment planned part having a tear seam in which a cloth material forming a part of the cover is sewn and an extra length part set in a part of the cloth material by the sewing. The tear seam may be broken by the inflation pressure of the airbag and the extra length part may be deployed.

With the vehicle seat according to the aspect of the present disclosure, the deployment planned part included in the restraint release part has the tear seam in which the cloth material forming a part of the cover of the seat cushion is sewn and the extra length part set in the part of the cloth material by the sewing. In the deployment planned part, the tear seam is broken by the inflation pressure of the airbag and the extra length part is deployed. Thereby, the restraint of the cover is released at at least one side in the seat front-rear direction with respect to the cushion airbag device. Since the pad of the seat cushion can be prevented from being exposed even when the extra length part is deployed, the appearance of the seat cushion can be prevented from being deteriorated due to the exposure of the pad.

In the aspect of the present disclosure, the restraint release part may include a restraining tool that is provided in the cover to restrain the cover to the frame or the pad and releases the restraint by being deformed by the inflation pressure of the airbag.

With the vehicle seat according to the aspect of the present disclosure, the restraining tool included in the restraint release part is provided in the cover to restrain the cover of the seat cushion to the frame or the pad. The restraining tool is deformed by the inflation pressure of the airbag, such that the restraint of the cover is released at at least one side in the seat front-rear direction with respect to the cushion airbag device. Therefore, for example, a deformation load of the restraining tool can be set when the restraining tool is manufactured.

As described above, in the vehicle seat according to the present disclosure, the effect of suppressing the occurrence of the submarine phenomenon can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
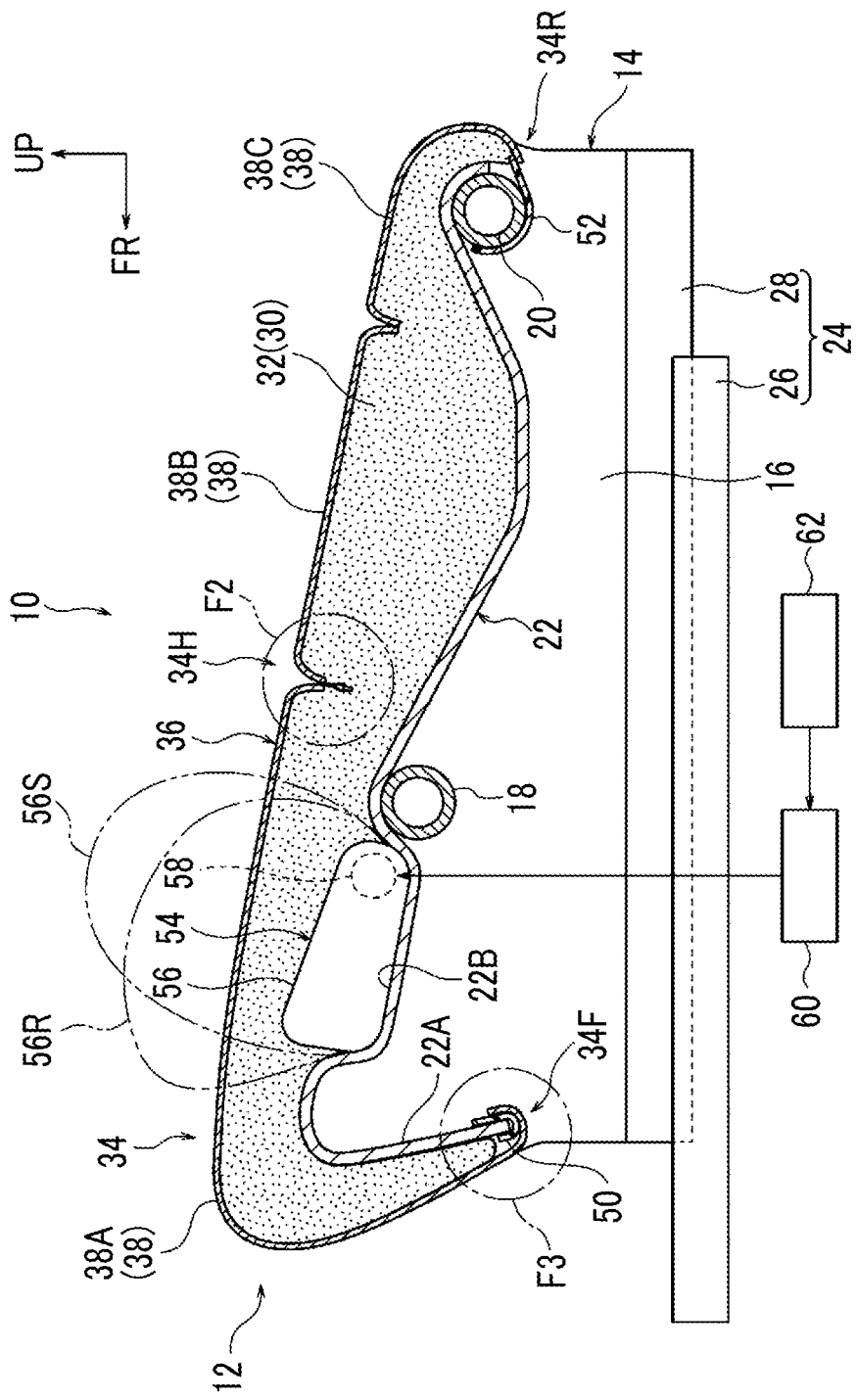
FIG. 1 is a vertical cross-sectional view showing a seat cushion of a vehicle seat according to a first embodiment.

Hereinafter, a vehicle seat 10 according to a first embodiment of the present disclosure will be described with reference to FIGS. 1 to 3. In each drawing, some reference signs may be omitted in order to make the drawings easier to see. Arrows FR, LH, UP shown appropriately in each drawing respectively show a front direction, a left direction, and an upward direction of a vehicle in which the vehicle seat 10 is mounted. Front-rear, right-left, and up-down directions of the vehicle seat 10 coincide with front-rear, right-left, and up-down directions of the vehicle. Hereinafter, when the front-rear, right-left, and up-down directions are simply used for description, the directions are considered to show directions with respect to the vehicle unless otherwise specified.

The vehicle seat 10 according to the first embodiment includes a seat cushion 12 on which an occupant (not shown) is seated. A lower end portion of a seat back (not shown) that supports a back of the occupant is connected to a rear end portion of the seat cushion 12, and a headrest (not shown) that supports a head of the occupant is connected to an upper end portion of the seat back.

The seat cushion 12 includes a cushion frame 14, which is a frame, a cushion pad 30, which is a pad, and a cushion cover 34, which is a cover (cover). The cushion frame 14 has a pair of right and left side frames 16 (the left side frame 16 is not shown in FIG. 1), a pair of front and rear pipe frames 18, 20, and a pan frame 22. In a front portion in the seat cushion 12, a cushion airbag device 54 is mounted.

The right and left side frames 16 are manufactured by, for example, press molding a metal plate and have long plate shapes with the front-rear direction as a longitudinal direction and the right-left direction (a vehicle width direction) as a plate thickness direction. The right and left side frames 16 are connected to a vehicle body floor portion (not shown) via a pair of right and left slide rails 24 (the left slide rail 24 is not shown in FIG. 1). The right and left slide rails 24 include a lower rail 26 fixed to the vehicle body floor portion and an upper rail 28 attached to be slidable in the front-rear direction with respect to the lower rail 26. The right and left side frames 16 may be connected to the upper rail 28 via a well-known lifter mechanism.

The front and rear pipe frames 18, 20 are made of, for example, a metal pipe material, and are disposed in an orientation with the right-left direction as an axial direction. The front pipe frame 18 is disposed slightly closer to a front side of the seat than a central portion of the seat cushion 12 in the front-rear direction. The rear pipe frame 20 is disposed in the rear end portion of the seat cushion 12. The right and left side frames 16 are connected in the right-left direction of the seat by the front and rear pipe frames 18, 20.

The pan frame 22 is manufactured by, for example, press molding a metal plate and disposed in an orientation in which the plate thickness direction of a main part is along the substantially up-down direction. The pan frame 22 is fixed to the right and left side frames 16 and the front and rear pipe frames 18, 20 by welding or the like, and is supported from a lower side by the right and left side frames 16 and the front and rear pipe frames 18, 20. A front wall part 22A with the substantially front-rear direction as the plate thickness direction is formed in a front end portion of the pan frame 22. The pan frame 22 may not be provided between the front and rear pipe frames 18, 20. Instead, a cushion spring called an S-spring or the like may be provided.

The cushion pad 30 includes a foam 32 such as urethane foam and a wire (not shown) embedded in the foam 32, and is attached to the cushion frame 14 from an upper side. The cushion pad 30 is supported from a lower side by the pan frame 22.

Figure 2:
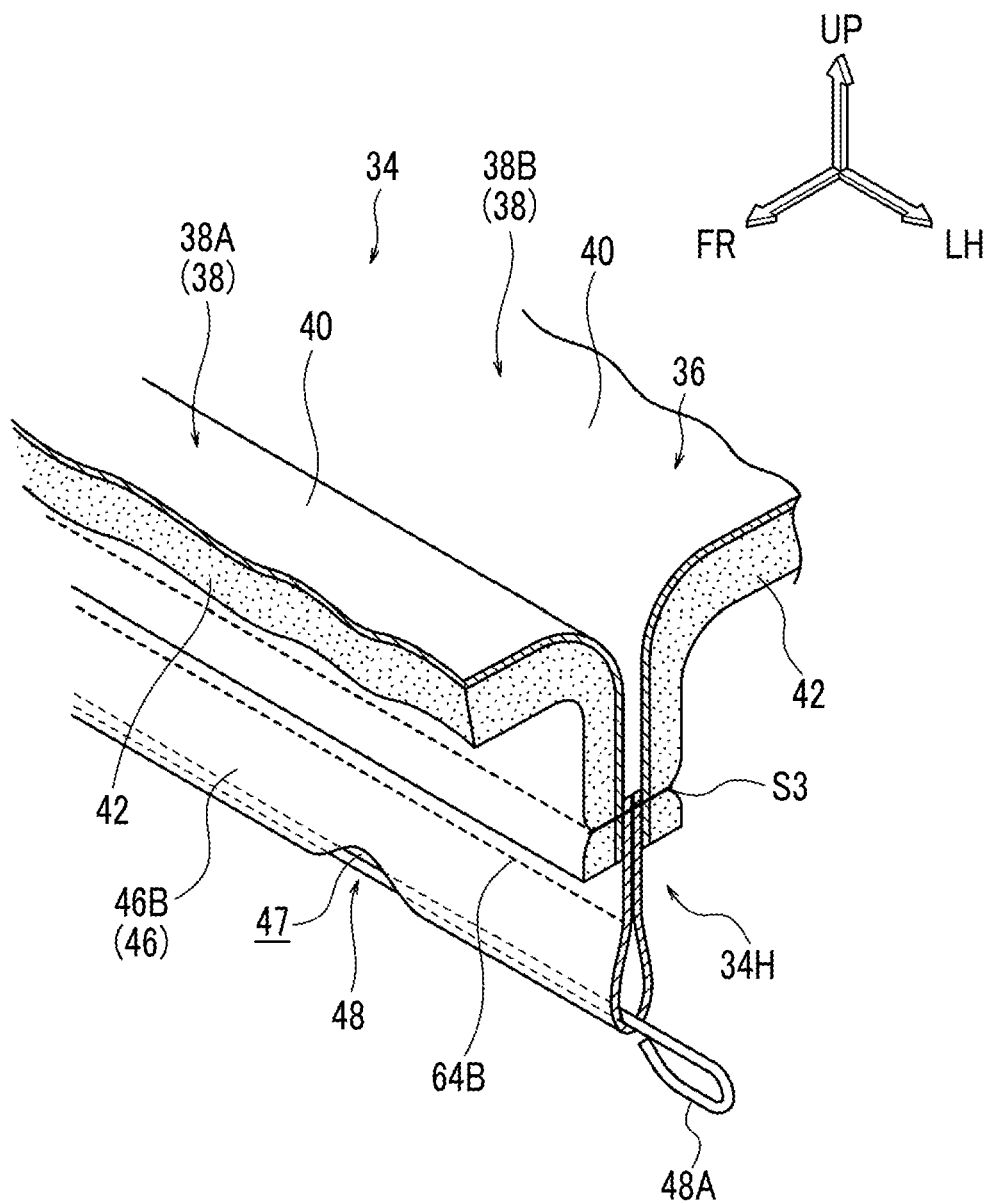
FIG. 2 is an enlarged perspective cross-sectional view showing a region marked with a reference sign F2 in FIG. 1 in an enlarged manner.
Figure 3:
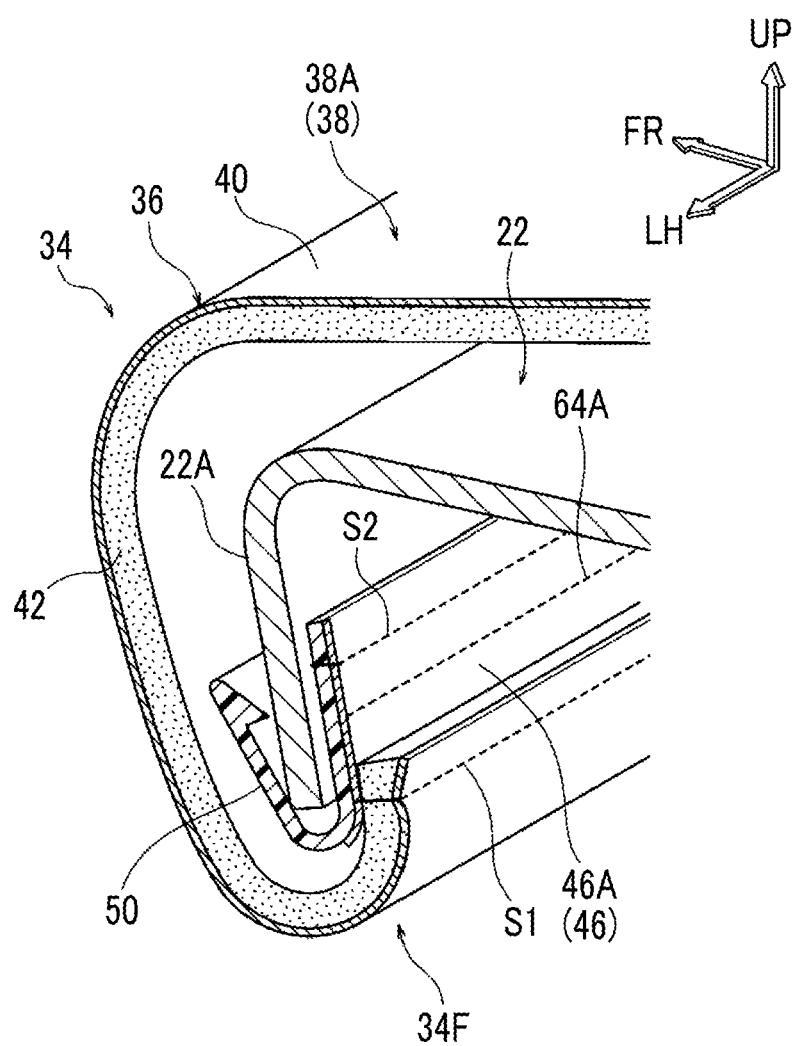
FIG. 3 is an enlarged perspective cross-sectional view showing a region marked with a reference sign F3 in FIG. 1 in an enlarged manner.

The cushion cover 34 includes a main body part 36 manufactured by sewing a plurality of cover pieces 38 including cover pieces 38A, 38B, 38C shown in FIG. 1 and a plurality of cloth materials 46 including a cloth material 46B shown in FIG. 2 and a cloth material 46A shown in FIG. 3. The main body part 36 is formed in a bag shape and covers the cushion pad 30 from the upper side. As shown in FIGS. 2 and 3, the cover pieces 38A, 38B, 38C included in the main body part 36 include a cover material 40 made of fabric, leather, synthetic leather or the like, and a urethane foam slab 42 adhered to a back surface of the cover material 40. In FIG. 3, the cushion pad 30 is not shown. In addition, each cover piece 38 may not have the urethane foam slab 42.

A plurality of parts of the cushion cover 34 is restrained to the cushion frame 14 and the cushion pad 30. Specifically, of the cushion cover 34, a front edge part 34F and a rear edge part 34R are restrained to the cushion frame 14, and a hanging part 34H provided in a middle portion in the front-rear direction (here, a central portion in the front-rear direction) is restrained to the cushion pad 30. As shown in FIGS. 2 and 3, cloth materials 46A, 46B are provided in the front edge part 34F and the hanging part 34H of the cushion cover 34, respectively. The cloth materials 46 including the cloth materials 46A, 46B are made of a flexible planar material such as cotton cloth and non-woven fabric.

As shown in FIG. 2, the cloth material 46B provided in the hanging part 34H is folded in half in a substantially U-shape. End portions on an open side are sewn onto a sewn part S3 of the cover piece 38A and the cover piece 38B. The cloth material 46B forms a substantially tubular hanging bag, and a hanging wire 48 is inserted inside the hanging bag. Annular parts 48A bent in an annular shape are formed at both end portions of the hanging wire 48. A part of the hanging wire 48 is exposed from a hole 47 formed in the cloth material 46B, and the part of the hanging wire 48 and a wire (not shown) provided in the cushion pad 30 are engaged with each other using a hog ring (not shown). In this way, the hanging part 34H, that is, the central portion of the cushion cover 34 in the front-rear direction is restrained to the cushion pad 30.

As shown in FIG. 3, the cloth material 46A provided in the front edge part 34F of the cushion cover 34 is formed in a long band shape with the right-left direction as a longitudinal direction and the up-down direction as a short direction. The cloth material 46A is disposed at a rear surface side of the front wall part 22A of the pan frame 22. A first end edge of the cloth material 46A in the short direction is sewn onto a front edge part of the cover piece 38A at a sewn part S1. A second end edge of the cloth material 46A in the short direction is sewn onto a clip (hook) 50 at a sewn part S2. The clip 50 is made of, for example, resin, is long in length with the right-left direction as a longitudinal direction and has a J-shape when viewed from the right-left direction. The clip 50 is hooked on a lower end portion of the front wall part 22A, such that the front edge part 34F of the cushion cover 34 is restrained to the cushion frame 14 via the cloth material 46A.

A hook 52 is attached to the rear edge part 34R of the cushion cover 34 via the cloth material 46 (not shown). The hook 52 is made of, for example, resin, is long in length with the right-left direction as a longitudinal direction and has a J-shape when viewed from the right-left direction. The hook 52 is hooked on the rear pipe frame 20, such that the rear edge part 34R of the cushion cover 34 is restrained to the cushion frame 14 via the cloth material 46 (not shown).

In the seat cushion 12 having the above configuration, a recessed part 22B recessed downward is formed in a front portion of the pan frame 22. The cushion airbag device 54 is disposed in the recessed part 22B. The cushion airbag device 54 includes a cushion airbag 56, which is an airbag, and an inflator 58, which is a gas generator. The cushion airbag 56 is formed in a bag shape by, for example, a nylon-based or polyester-based base cloth. The inflator 58 is accommodated in the cushion airbag 56. Normally, the cushion airbag 56 is folded at a predetermined folding way, and is modularized together with the inflator 58 (a state shown in FIG. 1).

The inflator 58 is, for example, a cylinder type inflator, and is fixed to the pan frame 22 via a retainer (not shown). As shown in FIG. 1, a control device 60 mounted in the vehicle is electrically connected to the inflator 58. A collision sensor 62 mounted in a front end portion or the like of the vehicle is electrically connected to the control device 60. The collision sensor 62 is, for example, an acceleration sensor. The control device 60 is configured to activate the inflator 58 when a frontal collision is detected based on a signal from the collision sensor 62. When a collision prediction sensor for predicting (forecasting) the frontal collision is electrically connected to the control device 60, the control device 60 may be configured to activate the inflator 58 when the frontal collision is predicted based on a signal from the collision prediction sensor.

When the inflator 58 is activated, the cushion airbag 56 is inflated and deployed by a pressure of a gas generated from the inflator 58, and a seat surface of the seat cushion 12 rises. At this time, the restraints of the cushion cover 34 to the cushion frame 14 and the cushion pad 30 are released by an inflation pressure of the cushion airbag 56 at both sides in the front-rear direction with respect to the cushion airbag device 54.

Specifically, in the first embodiment, the front edge part 34F and the hanging part 34H of the cushion cover 34 are provided with fragile parts 64A, 64B as restraint release parts, respectively. Respectively, the fragile parts 64A, 64B are perforations formed in the cloth materials 46A, 46B and are broken by the inflation pressure of the cushion airbag 56. In this manner, the restraint of the front edge part 34F to the cushion frame 14 and the restraint of the hanging part 34H to the cushion pad 30 are released. As a result, the inflation and deployment of the cushion airbag 56 is less likely to be restricted by the cushion cover 34. 56S in FIG. 1 is a deployed shape when the cushion airbag 56 is inflated and deployed singly. Further, 56R in FIG. 1 is a deployed shape of the cushion airbag 56 when the inflation and deployment is restricted by the cushion cover 34. In the first embodiment, a deployed shape of the cushion airbag 56 can be close to the shape of 56S in FIG. 1.

Action and Effect

Next, action and effect of the first embodiment will be described.

In the vehicle seat 10 having the above configuration, the seat cushion 12 in which the parts of the cushion cover 34 is restrained to the cushion frame 14 and the cushion pad 30 is provided. In the front portion in the seat cushion 12, the cushion airbag device 54 configured to inflate and deploy the cushion airbag 56 at a time of the frontal collision of the vehicle is mounted. The fragile parts (perforations) 64A, 64B provided in the front edge part 34F and the hanging part 34H of the cushion cover 34 among the parts are broken by the inflation pressure of the cushion airbag 56. In this manner, the restraint of the front edge part 34F to the cushion frame 14 and the restraint of the hanging part 34H to the cushion pad 30 are released. As a result, the inflation and deployment of the cushion airbag 56 is less likely to be restricted by the cushion cover 34, and the cushion airbag 56 is easy to be inflated to a desired shape. Therefore, the effect of suppressing the occurrence of the submarine phenomenon is improved as compared to the conventional case.

Moreover, in the first embodiment, the front edge part 34F and the hanging part 34H of the cushion cover 34 are provided with the fragile parts 64A, 64B, respectively, and the restraints of the cushion cover 34 are released at both sides in the front-rear direction with respect to the cushion airbag device 54. As a result, it is possible to effectively suppress the restriction of the inflation and deployment of the cushion airbag 56 by the cushion cover 34.

Further, in the first embodiment, since the fragile parts 64A, 64B are configured to be broken by the inflation pressure of the cushion airbag 56, the restraint release parts can have a simple configuration. Moreover, the fragile parts 64A, 64B are perforations formed in the cloth materials 46A, 46B forming a part of the cushion cover 34. As a result, the fragile parts 64A, 64B can have a simple configuration.

Modified Example of First Embodiment

Figure 4:
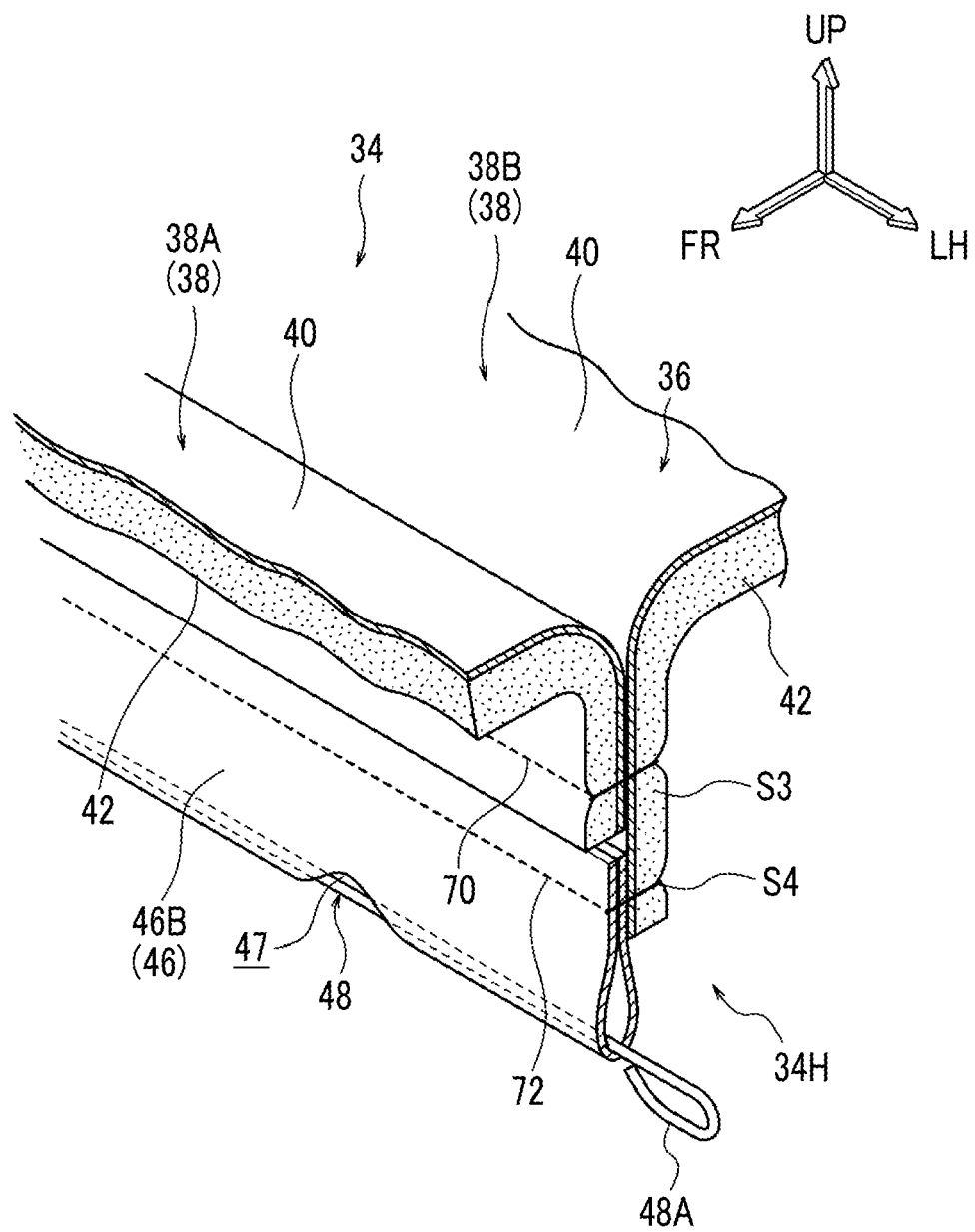
FIG. 4 is a perspective cross-sectional view corresponding to FIG. 2 showing Modified Example 1 of the first embodiment.
Figure 5:
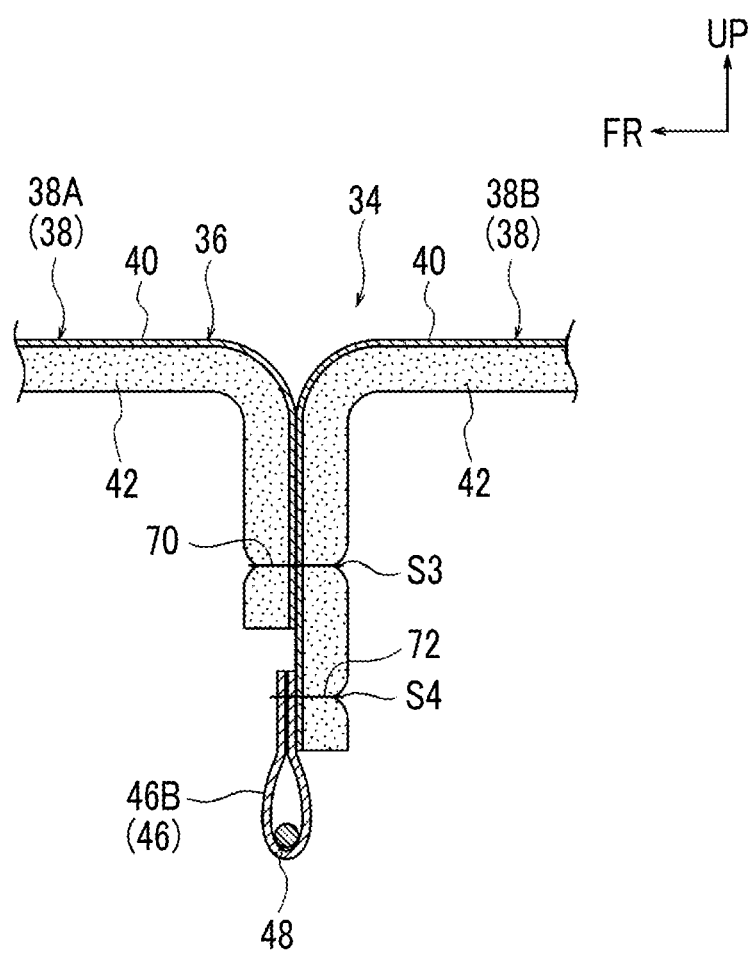
FIG. 5 is a cross-sectional view of a configuration shown in FIG. 4 as viewed from a seat width direction.

Next, Modified Examples of the first embodiment will be described. In Modified Example 1 shown in FIGS. 4 and 5, a configuration of the hanging part 34H of the cushion cover 34 is different from that of the first embodiment. In the hanging part 34H, the cover piece 38B is extended downward more than the cover piece 38A in a lower side of the sewn part S3, and the cloth material 46B is sewn onto a sewn part S4 set in the extended part. The sewn part S3 is sewn by a fragile (for example, 20 yarn count) thread 70 having a large yarn count, and the sewn part S4 is sewn by a tough (for example, five yarn count) thread 72 having a small yarn count.

That is, in Modified Example 1, the cover piece 38A and the cover piece 38B of the cushion cover 34 are sewn by the fragile thread 70. The thread 70 is an example of the fragile part as the restraint release part, and is broken by the inflation pressure of the cushion airbag 56. With this, the restraint of the hanging part 34H to the cushion pad 30 (here, the restraint of the cover piece 38A) is released. Therefore, also in Modified Example 1, the cushion airbag 56 is easy to be inflated to the desired shape as in the first embodiment, and the effect of suppressing the occurrence of the submarine phenomenon is improved as compared to the conventional case. Moreover, in Modified Example 1, the cover piece 38B to which a load from the buttocks of the occupant is applied is sewn onto the cloth material 46B by the tough thread 72 having a small yarn count. Therefore, it is easy to secure the durability of the cushion cover 34 for normal use.

In Modified Example 1, the yarn count of the thread 70 of the sewn part S3 may be set small, while the yarn count of the thread 72 of the sewn part S4 may be set large. In that case, even the thread 72 of the sewn part S4 is broken by the inflation pressure of the cushion airbag 56, the cushion pad 30 is not exposed. Therefore, the deterioration of the appearance of the seat cushion 12 can be suppressed.

Figure 6:
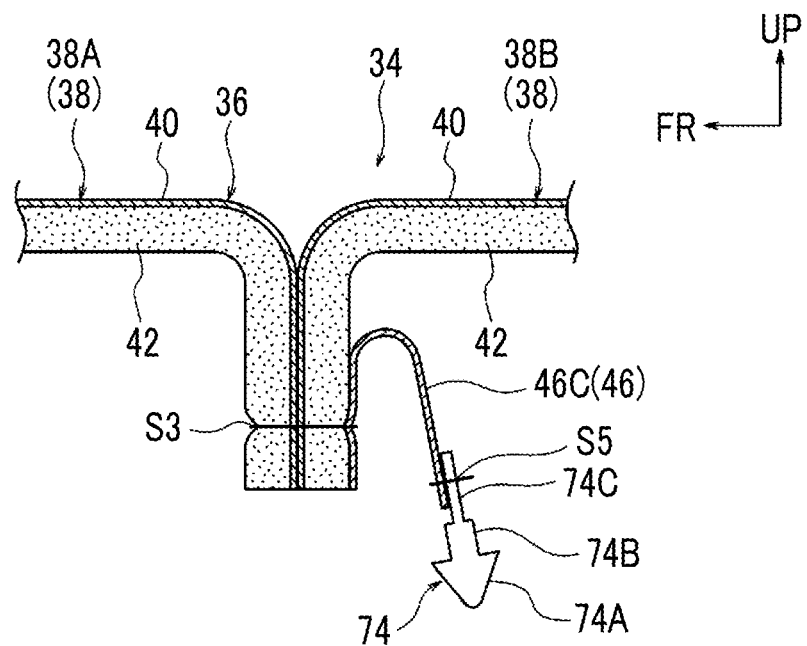
FIG. 6 is a cross-sectional view corresponding to FIG. 5 showing Modified Example 2 of the first embodiment.
Figure 7:
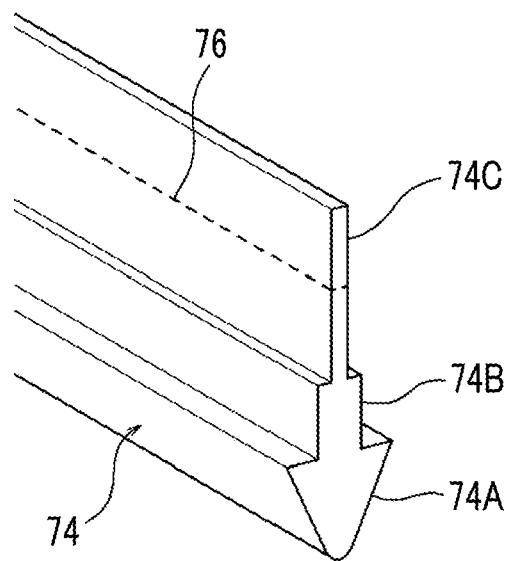
FIG. 7 is an enlarged perspective view showing a partial configuration of a hogless suspender shown in FIG. 6 in an enlarged manner.

In Modified Example 2 shown in FIG. 6, a configuration of the hanging part 34H of the cushion cover 34 is different from that of the first embodiment. In the hanging part 34H, a cloth material 46C different from the cloth material 46B of the first embodiment is sewn onto the sewn part S3. The cloth material 46C is formed in a long band shape with the right-left direction as a longitudinal direction, and a first end edge in the short direction is sewn onto the sewn part S3. A second end edge of the cloth material 46C in the short direction is sewn onto a hogless suspender 74 (see FIG. 7) at a sewn part S5.

The hogless suspender 74 is an example of the restraining tool in the present disclosure. The hogless suspender 74 is made of, for example, resin, is long in length with the right-left direction as a longitudinal direction and has an arrow shape when viewed from the right-left direction. The hogless suspender 74 includes a fitting part 74A formed in a triangular prism shape, a thick plate part 74B formed in a plate shape and integrally connected to the fitting part 74A, and a thin plate part 74C integrally extending from an end portion of the thick plate part 74B opposite to the fitting part 74A. The thin plate part 74C has a plate shape thinner than the thick plate part 74B. The thin plate part 74C is sewn onto the cloth material 46C at the sewn part S5. Further, the thin plate part 74C is provided with a fragile part 76 (not shown in FIG. 6) at a part on the thick plate part 74B side than the sewn part S5. The fragile part 76 is a perforation formed in the thin plate part 74C as an example. The fragile part 76 extends along the longitudinal direction of the hogless suspender 74. The fitting part 74A of the hogless suspender 74 is fitted to another resin member embedded in the cushion pad 30. As a result, the hanging part 34H of the cushion cover 34 is restrained to the cushion pad 30 via the cloth material 46C.

In Modified Example 2, the fragile part 76 of the hogless suspender 74 is broken by the inflation pressure of the cushion airbag 56. With this, the restraint of the hanging part 34H to the cushion pad 30 is released. Therefore, also in Modified Example 2, the cushion airbag 56 is easy to be inflated to the desired shape as in the first embodiment, and the effect of suppressing the occurrence of the submarine phenomenon is improved as compared to the conventional case. Note that, instead of the fragile part 76 formed in the hogless suspender 74, a thread of the sewn part S5 may be a fragile part.

Second Embodiment

Next, a second embodiment of the present disclosure will be described. Configurations and actions basically the same as those of the first embodiment are designated by the same reference signs as those of the first embodiment, and the description thereof will be omitted.

Figure 8:
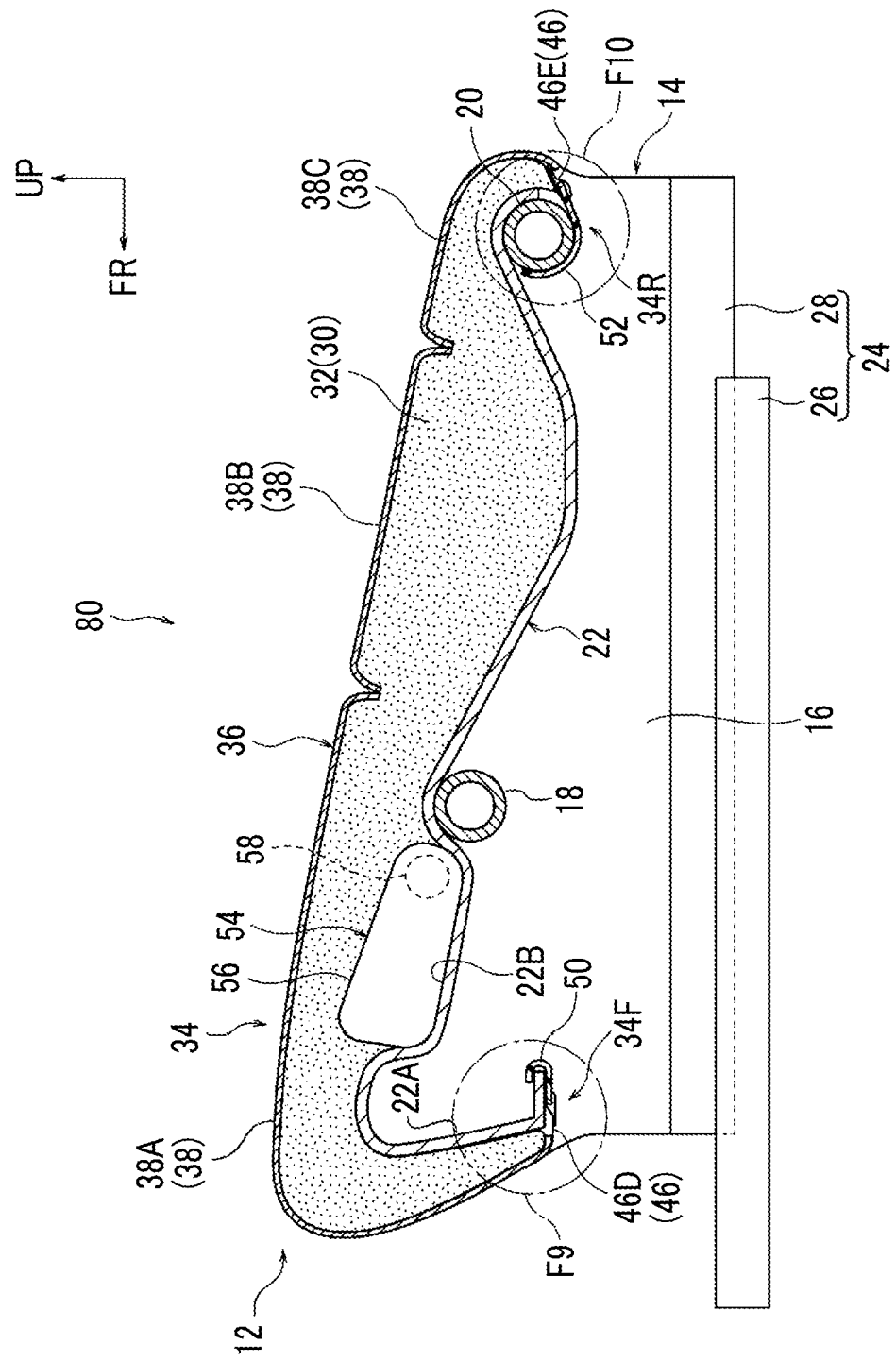
FIG. 8 is a vertical cross-sectional view showing a seat cushion of a vehicle seat according to a second embodiment.

FIG. 8 is a vertical cross-sectional view showing the seat cushion 12 of a vehicle seat 80 of the second embodiment of the present disclosure. In the vehicle seat 80, the middle portion of the cushion cover 34 in the front-rear direction is not restrained to the cushion pad 30, and each of the front edge part 34F and the rear edge part 34R of the cushion cover 34 is provided with the restraint release part.

Figure 9:
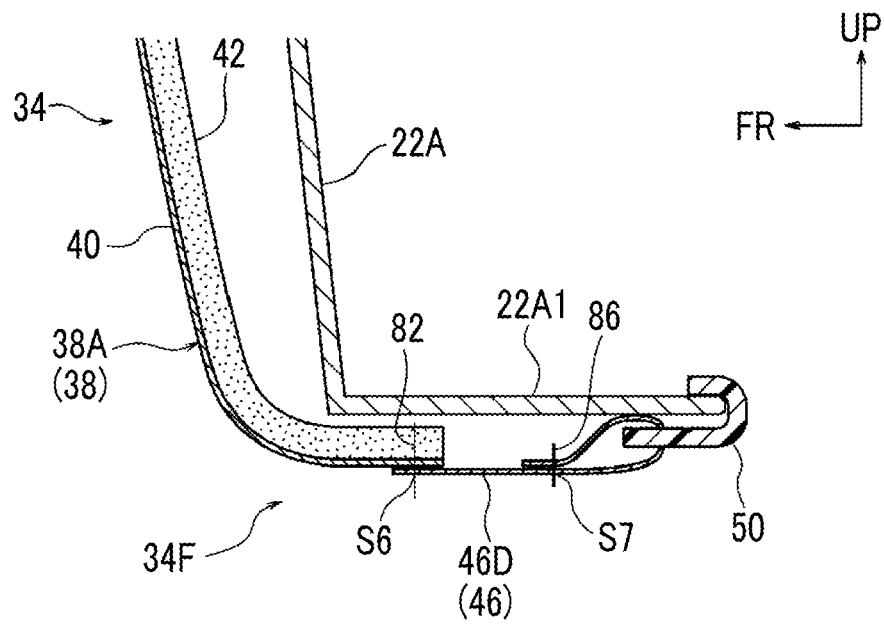
FIG. 9 is an enlarged cross-sectional view showing a region marked with a reference sign F9 in FIG. 8 in an enlarged manner.

As shown in FIG. 9, in the front edge part 34F of the cushion cover 34, the cover piece 38A and a cloth material 46D are sewn at a sewn part S6. The cloth material 46D is formed in a long band shape with the right-left direction as a longitudinal direction, and a first end edge in the short direction is sewn onto the sewn part S6. A second end edge side of the cloth material 46D in the short direction is inserted into a long hole (not shown) formed in the clip 50 and folded back, and a before-folded part and an after-folded part are sewn at the sewn part S7. The clip 50 is hooked on the lower end portion of the front wall part 22A of the cushion frame 14, such that the front edge part 34F is restrained to the cushion frame 14. In the second embodiment, a flange part 22A1 extending rearward is formed in the lower end portion of the front wall part 22A, and the clip 50 is hooked on a rear end portion of the flange part 22A1.

Figure 10:
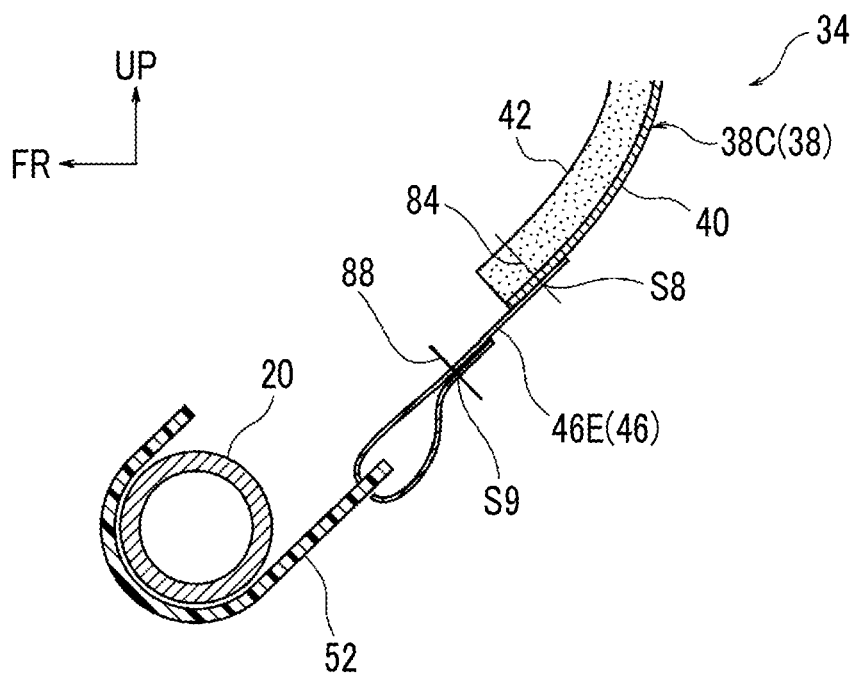
FIG. 10 is an enlarged cross-sectional view showing a region marked with a reference sign F10 in FIG. 8 in an enlarged manner.

As shown in FIG. 10, in the rear edge part 34R of the cushion cover 34, the cover piece 38C and a cloth material 46E are sewn at a sewn part S8. The cloth material 46E is formed in a long band shape with the right-left direction as a longitudinal direction, and a first end edge in the short direction is sewn onto the sewn part S8. A second end edge side of the cloth material 46E in the short direction is inserted into a long hole (not shown) formed in the hook 52 and folded back, and a before-folded part and an after-folded part are sewn at the sewn part S9. The hook 52 is hooked on the rear pipe frame 20, such that the rear edge part 34R is restrained to the cushion frame 14.

The sewn parts S6, S8 are sewn by fragile (for example, 20 yarn count) threads 82, 84 having a large yarn count, and the sewn parts S7, S9 are sewn by tough (for example, five yarn count) threads 86, 88 having a small yarn count. The threads 82, 84 are examples of the fragile parts as the restraint release parts, and are broken by the inflation pressure of the cushion airbag 56. With this, the restraints of the front edge part 34F and the rear edge part 34R to the cushion pad 30 are released.

Further, in the second embodiment, the thread 84 of the sewn part S8 of the rear edge part 34R is set to be broken with a lower load than the thread 82 of the sewn part S6 of the front edge part 34F. The setting can be achieved, for example, by setting the width of the sewn part S8 to be narrower than the width of the sewn part S6, or dividing the sewn part S8 into a plurality of parts. In the second embodiment, configurations other than the above are the same as those in the first embodiment.

Figure 11:
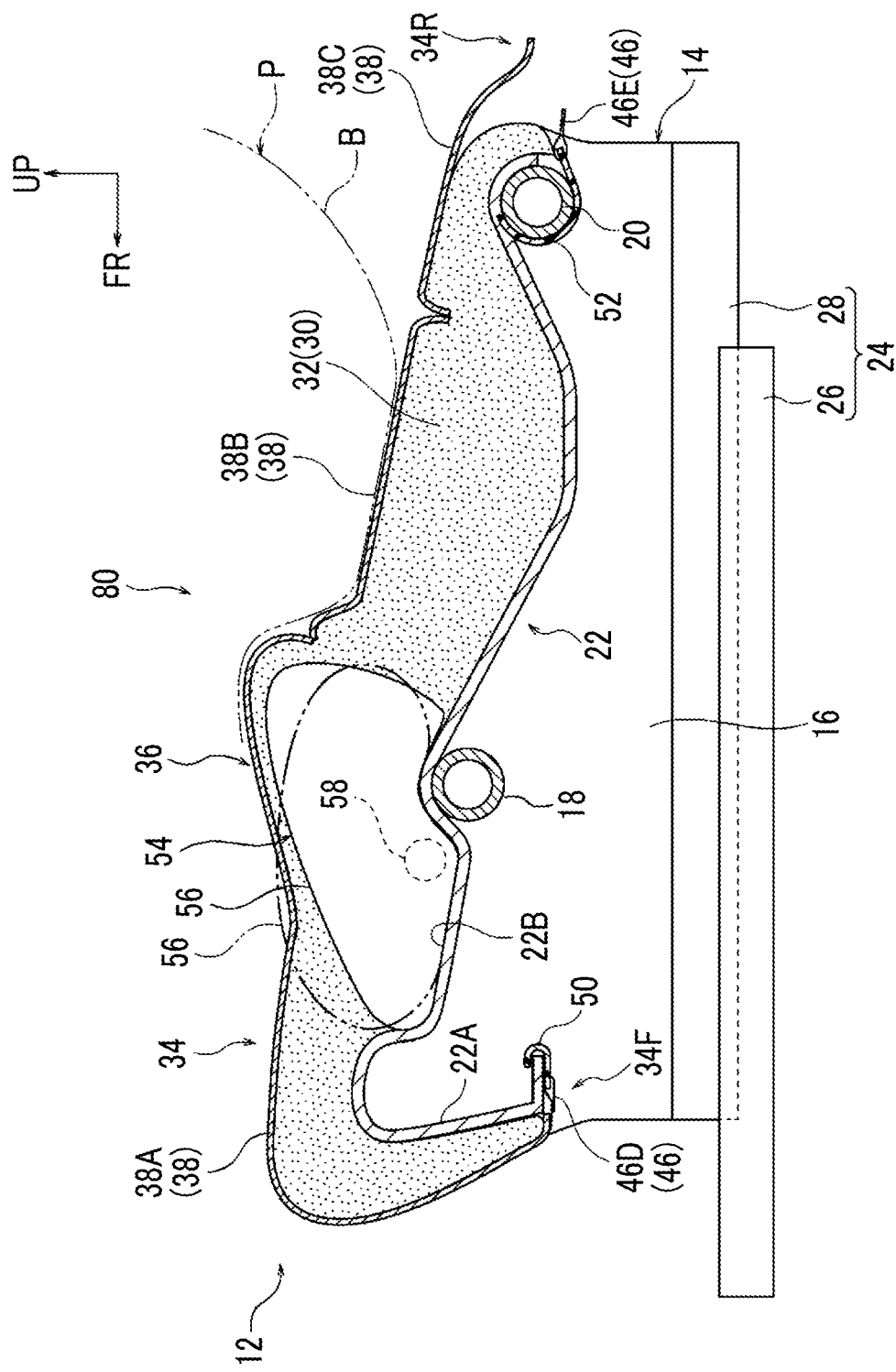
FIG. 11 is a vertical cross-sectional view corresponding to FIG. 8 showing an initial stage state of a frontal collision.

In the seat cushion 12 of the second embodiment, each of the front edge part 34F and the rear edge part 34R of the cushion cover 34 is restrained to the cushion frame 14. The threads 82, 84 of the sewn parts S6, S8 provided in the front edge part 34F and the rear edge part 34R are the fragile parts, respectively. Then, when the cushion airbag 56 is inflated and deployed at the front portion in the seat cushion 12, the thread 84 of the sewn part S8 provided in the rear edge part 34R is broken earlier than the thread 82 of the sewn part S6 provided in the front edge part 34F. Therefore, as shown in FIG. 11, the restraint of the rear edge part 34R to the cushion frame 14 is released earlier than the front edge part 34F. As a result, a rear portion side of the cushion airbag 56 is easily inflated and deployed upward, so that the cushion airbag 56 can be inflated and deployed in a shape that easily restrains the waist (buttocks) B of an occupant P at the initial stage of the frontal collision.

Figure 12:
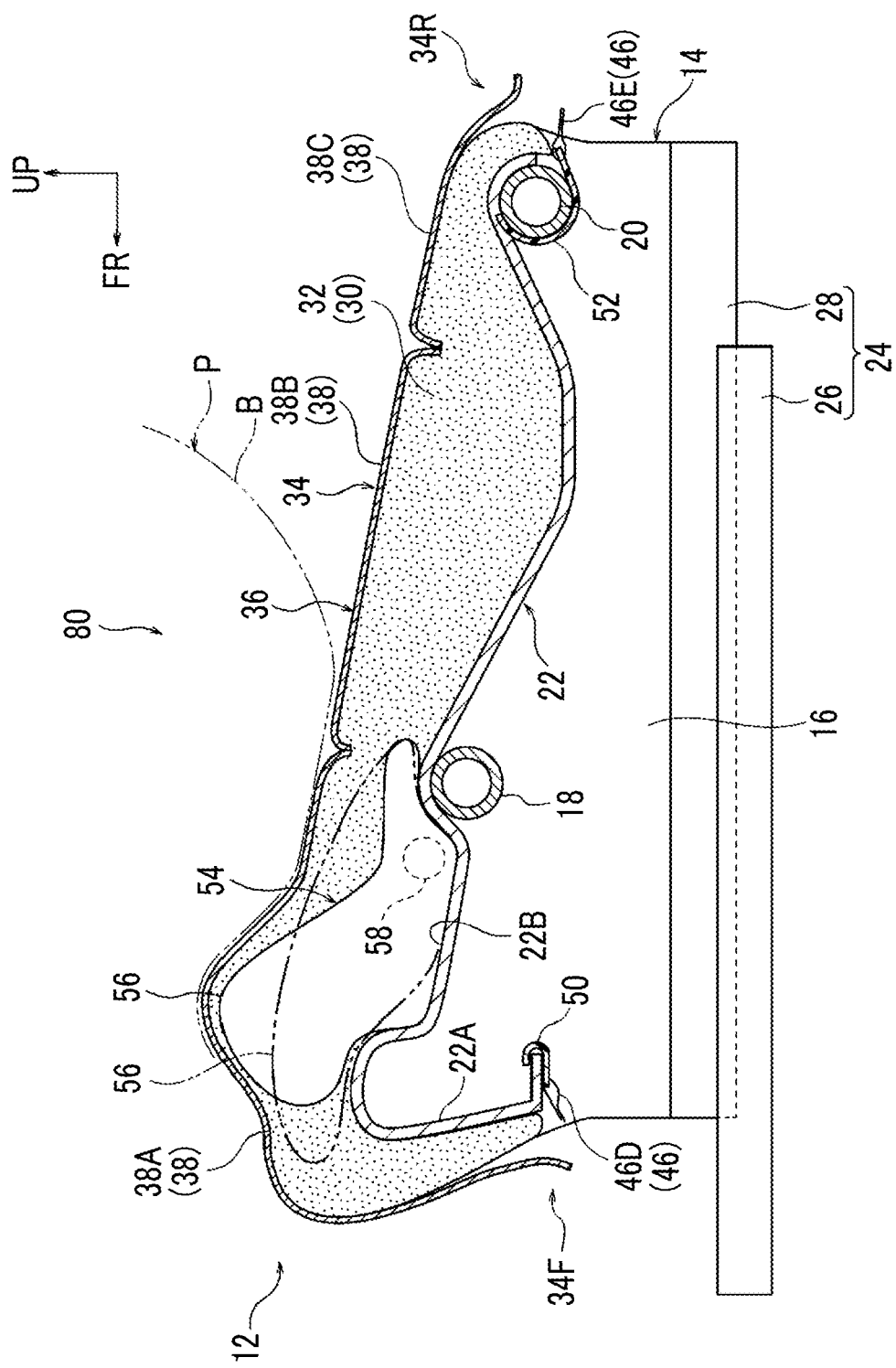
FIG. 12 is a vertical cross-sectional view corresponding to FIG. 8 showing a latter half state of the frontal collision.

After that, when the thread 82 of the sewn part S6 provided in the front edge part 34F is broken and the restraint of the front edge part 34F to the cushion frame 14 is released, the front portion side of the cushion airbag 56 is easily inflated and deployed upward. Therefore, the waist B is easily restrained until the latter half of the frontal collision in which the waist B of the occupant P moves slightly toward the front side due to the inertia. From the above description, also in the second embodiment, the effect of suppressing the occurrence of the submarine phenomenon is improved as compared to the conventional case. The cushion airbag 56 shown by the two-dot chain line in FIGS. 11 and 12 shows a deployed shape in a case where the restraints of the front edge part 34F and the rear edge part 34R to the cushion frame 14 are not released.

In the second embodiment, the restraints of both the front edge part 34F and the rear edge part 34R of the cushion cover 34 to the cushion frame 14 are released, but the present disclosure is not limited to this. Solely the restraint of the rear edge part 34R to the cushion frame 14 may be released. Even in that case, the cushion airbag 56 can be inflated and deployed in the shape that easily restrains the buttocks B of the occupant P at the initial stage of the frontal collision.

In addition, in the second embodiment, the middle portion of the cushion cover 34 in the front-rear direction is not restrained to the cushion pad 30, but the present disclosure is not limited to this. The same hanging part 34H as the hanging part 34H of the first embodiment may be provided in the middle portion of the cushion cover 34 in the front-rear direction and the restraint of hanging part 34H to the cushion pad 30 may be released at the initial stage of the frontal collision.

Modified Example of Second Embodiment

Figure 13:
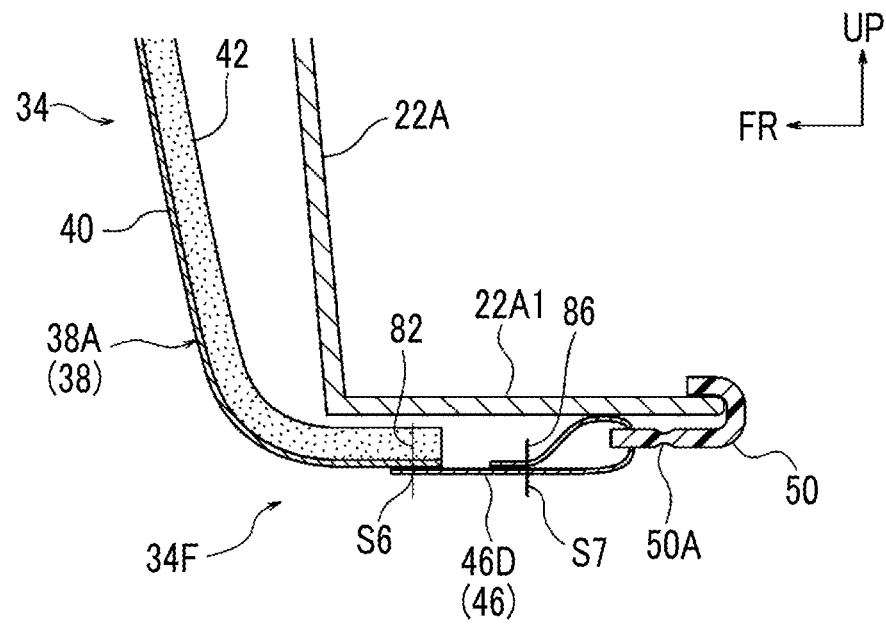
FIG. 13 is a cross-sectional view corresponding to FIG. 9 showing Modified Example 1 of the second embodiment.

Next, Modified Examples of the second embodiment will be described. In Modified Example 1 shown in FIG. 13, a configuration of the front edge part 34F of the cushion cover 34 is different from that of the second embodiment. The thread 82 of the sewn part S6 provided in the front edge part 34F is a tough thread having a small yarn count. Further, a fragile part 50A that is broken by the inflation pressure of the cushion airbag 56 is set in the clip 50 (the restraining tool) provided in the front edge part 34F. The fragile part 50A is broken, such that the restraint of the front edge part 34F to the cushion frame 14 is released. As an example, a load at which the fragile part 50A is broken is set to be higher than a load at which the thread 84 of the sewn part S8 provided in the rear edge part 34R is broken. In Modified Example 1, configurations other than the above are the same as those in second embodiment. Also in Modified Example 1, basically the same effect as in the second embodiment can be obtained.

Figure 14:
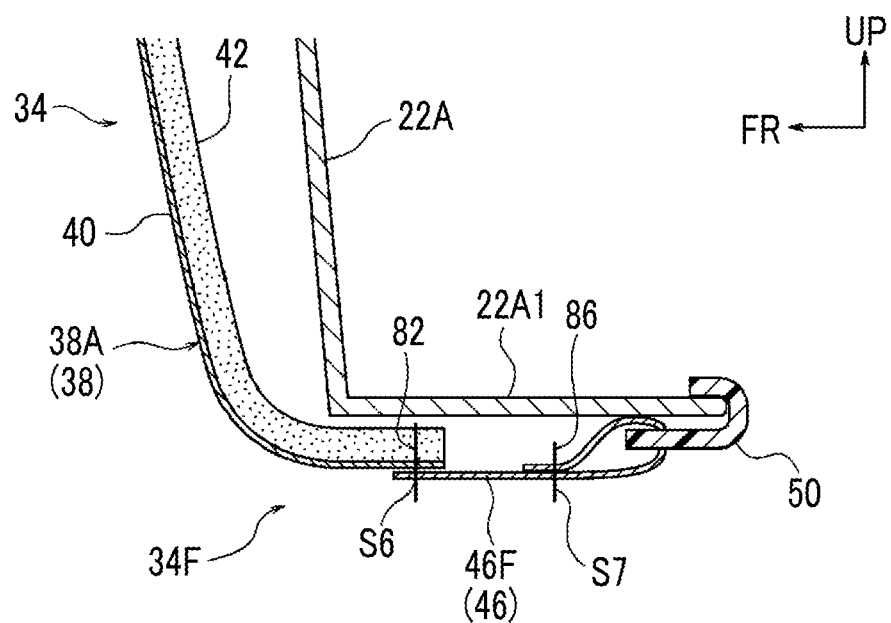
FIG. 14 is a cross-sectional view corresponding to FIG. 9 showing Modified Example 2 of the second embodiment.

In Modified Example 2 shown in FIG. 14, a configuration of the front edge part 34F of the cushion cover 34 is different from that of the second embodiment. The thread 82 of the sewn part S6 provided in the front edge part 34F is a tough thread having a small yarn count. Further, a cloth material 46F provided in the front edge part 34F is an example of "restraint release part" in the present disclosure, and is a stretch cloth that stretches by 20 mm or more by the inflation pressure of the cushion airbag 56. Hereinafter, the cloth material 46F is referred to as "stretch cloth 46F". The stretch cloth 46F is provided, such that, for example, a direction of an action of a load due to the inflation pressure of the cushion airbag 56 is a positive bias direction (a direction inclined by 45 degrees with respect to the warp and weft of the cloth). As an example, a load at which the stretch cloth 46F is stretched is set to be higher than the load at which the thread 84 of the sewn part S8 provided in the rear edge part 34R is broken. In Modified Example 2, configurations other than the above are the same as those in second embodiment.

In Modified Example 2, the stretch cloth 46F (stretch cloth) is stretched by the inflation pressure of the cushion airbag 56, such that the restraint of the front edge part 34F of the cushion cover 34 to the cushion frame 14 is released. As a result, basically the same effect as in the second embodiment can be obtained. Moreover, since a front end portion of the cushion pad 30 can be prevented from being exposed even when the stretch cloth 46F is stretched, the appearance of the seat cushion 12 can be prevented from being deteriorated due to the exposure of the cushion pad 30. A material of the stretch cloth (stretch member) 46F is not limited to cloth, and may be rubber.

Figure 15:
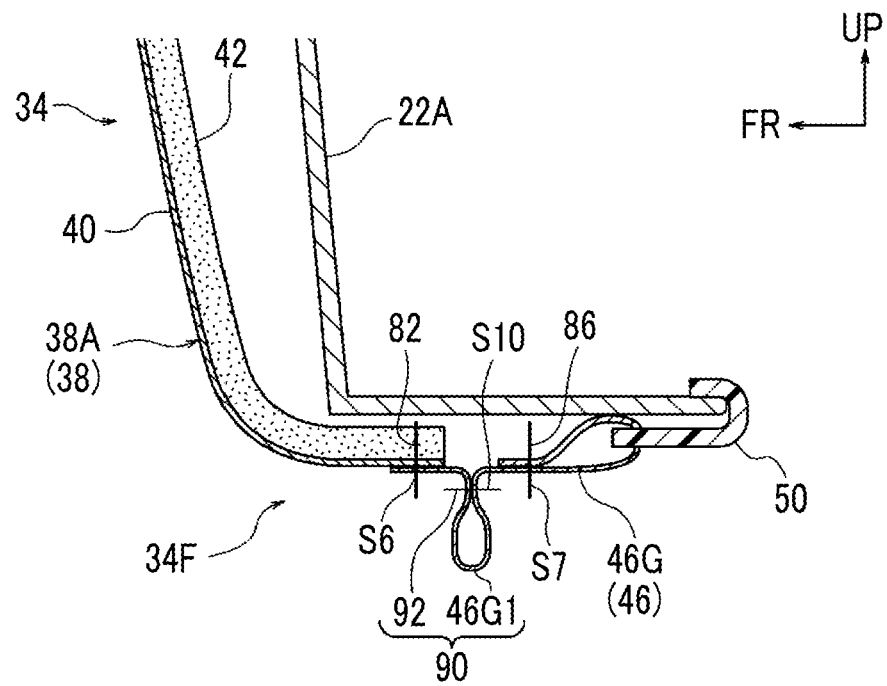
FIG. 15 is a cross-sectional view corresponding to FIG. 9 showing Modified Example 3 of the second embodiment.

In Modified Example 3 shown in FIG. 15, a configuration of the front edge part 34F of the cushion cover 34 is different from that of the second embodiment. The thread 82 of the sewn part S6 provided in the front edge part 34F is a tough thread having a small yarn count. Further, a deployment planned part 90 having a tear seam (a fragile thread) 92 in which a cloth material 46G forming a part of the cushion cover 34 is sewn at a sewn part S10 and an extra length part 46G1 set in a part of the cloth material 46G by the sewing is included in the front edge part 34F. As an example, a load at which the tear seam 92 is broken is set to be higher than the load at which the thread 84 of the sewn part S8 provided in the rear edge part 34R is broken. In Modified Example 3, configurations other than the above are the same as those in second embodiment.

In the deployment planned part of Modified Example 3, the tear seam 92 is broken by the inflation pressure of the cushion airbag 56 and the extra length part 46G1 is deployed. As a result, the restraint of the front edge part 34F to the cushion frame 14 is substantially released. As a result, basically the same effect as in the second embodiment can be obtained. Moreover, since the front end portion of the cushion pad 30 can be prevented from being exposed even when the extra length part 46G1 is deployed, the appearance of the seat cushion 12 can be prevented from being deteriorated due to the exposure of the cushion pad 30.

Figure 16:
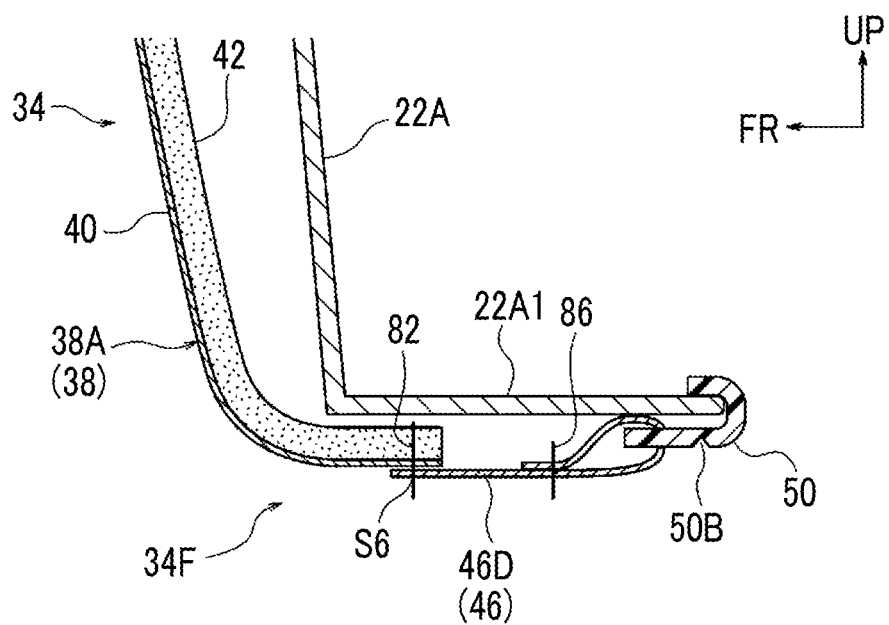
FIG. 16 is a cross-sectional view corresponding to FIG. 9 showing Modified Example 4 of the second embodiment.

In Modified Example 4 shown in FIG. 16, a configuration of the front edge part 34F of the cushion cover 34 is different from that of the second embodiment. The thread 82 of the sewn part S6 provided in the front edge part 34F is a tough thread having a small yarn count. Further, a deform part 50B that is deformed (here, bent) by the inflation pressure of the cushion airbag 56 is set in the clip 50 (the restraining tool) provided in the front edge part 34F. As an example, the deform part 50B is a part where a notch is formed in the clip 50. The deform part 50B is deformed, such that the restraint of the front edge part 34F to the cushion frame 14 is substantially released. As an example, a load at which the deform part 50B is deformed is set to be higher than the load at which the thread 84 of the sewn part S8 provided in the rear edge part 34R is broken. In Modified Example 4, configurations other than the above are the same as those in second embodiment. Also in Modified Example 4, basically the same effect as in the second embodiment can be obtained.

Note that, in Modified Example 4, instead of forming the notch in the clip 50, that is, forming the clip 50 in a shape that is easily deformed, the clip 50 may be made of a soft material (for example, an olefin-based thermoplastic elastomer), such that the clip 50 may be deformed (for example, bent) by the inflation pressure of the cushion airbag 56.

In addition, the present disclosure can be variously modified and implemented without departing from the gist of the disclosure. Also, it is needless to say that the scope of rights of the present disclosure is not limited to the above embodiments.

What is claimed is:

1. A vehicle seat comprising:
   a seat cushion on which an occupant is configured to be seated, the seat cushion including a cover, a frame and a pad, a plurality of parts of the cover being restrained to the frame and the pad;
   a cushion airbag device mounted in a front portion in the seat cushion and configured to inflate and deploy an airbag at a time of a frontal collision of a vehicle; and
   a restraint release part provided in a part of the cover positioned at at least one side in a seat front-rear direction with respect to the cushion airbag device among the plurality of parts of the cover and the restraint release part being configured to release the restraint of the part of the cover with an inflation pressure of the airbag, wherein the cover includes a front edge part and a hanging part, the front edge part is restrained to the frame, the hanging part is provided in a middle portion of the cover in the seat front-rear direction and restrained to the pad; and each of the front edge part and the hanging part is provided with the restraint release part.

2. The vehicle seat according to any one of claim 1, wherein the restraint release part includes a fragile part that is broken by the inflation pressure of the airbag.

3. The vehicle seat according to claim 2, wherein the fragile part is a perforation formed in a cloth material of the cover.

4. The vehicle seat according to claim 2, wherein the fragile part is a fragile thread with which a main body part of the cover and a cloth material that forms a part of the cover have been sewn together.

5. The vehicle seat according to claim 2, wherein the fragile part is set in a resin restraining tool provided in the cover to restrain the cover to the frame or the pad.

6. The vehicle seat according to claim 1, wherein the restraint release part includes a stretch cloth that forms a part of the cover and stretches by 20 mm or more by the inflation pressure of the airbag.

7. The vehicle seat according to claim 1, wherein:

the restraint release part includes a deployment planned part having a tear seam in which a cloth material forming a part of the cover is sewn and an extra length part set in a part of the cloth material by the sewing; and the tear seam is broken by the inflation pressure of the airbag and the extra length part is deployed.

8. The vehicle seat according to claim 1, wherein the restraint release part includes a restraining tool provided in the cover configured to restrain the cover to the frame or the pad and releases the restraint by being deformed by the inflation pressure of the airbag.

9. A vehicle seat comprising:

a seat cushion including a cover, a frame and a pad, a plurality of parts of the cover being restrained to the frame and the pad;

a cushion airbag device mounted in a front portion in the seat cushion and configured to inflate and deploy an airbag at a time of a frontal collision of a vehicle; and a restraint release part provided in a part of the cover positioned at at least one side in a seat front-rear direction with respect to the cushion airbag device among the plurality of parts of the cover and the restraint release part being configured to release the restraint of the part of the cover with an inflation pressure of the airbag, wherein the cover includes a front edge part and a hanging part, the front edge part is restrained to the frame, the hanging part is provided in a middle portion of the cover in the seat front-rear direction and restrained to the pad; and each of the front edge part and the hanging part is provided with the restraint release part.

10. The vehicle seat according to any one of claim 9, wherein the restraint release part includes a fragile part that is broken by the inflation pressure of the airbag.

11. The vehicle seat according to claim 10, wherein the fragile part is a perforation formed in a cloth material of the cover.

12. The vehicle seat according to claim 10, wherein the fragile part is a fragile thread with which a main body part of the cover and a cloth material that forms a part of the cover have been sewn together.

13. The vehicle seat according to claim 10, wherein the fragile part is set in a resin restraining tool provided in the cover to restrain the cover to the frame or the pad.

14. A vehicle seat comprising:

a seat cushion including a cover, a frame and a pad, a plurality of parts of the cover being restrained to the frame and the pad;

a cushion airbag device mounted in a front portion in the seat cushion and configured to inflate and deploy an airbag at a time of a frontal collision of a vehicle; and a restraint release part provided in a part of the cover positioned at at least one side in a seat front-rear direction with respect to the cushion airbag device among the plurality of parts of the cover and the restraint release part being configured to release the restraint of the part of the cover with an inflation pressure of the airbag, wherein the cover includes a front edge part and an rear edge part, each of the front edge part and the rear edge part is restrained to the frame;

each of the front edge part and the rear edge part is provided with the restraint release part; and the restraint release part provided in the rear edge part configured to release the restraint earlier than the restraint release part provided in the front edge part.

15. The vehicle seat according to any one of claim 14, wherein the restraint release part includes a fragile part that is broken by the inflation pressure of the airbag.

16. The vehicle seat according to claim 15, wherein the fragile part is a perforation formed in a cloth material of the cover.

17. The vehicle seat according to claim 15, wherein the fragile part is a fragile thread with which a main body part of the cover and a cloth material that forms a part of the cover have been sewn together.

18. The vehicle seat according to claim 15, wherein the fragile part is set in a resin restraining tool provided in the cover to restrain the cover to the frame or the pad.

* * * * *